United States Patent [19]

Nishijima et al.

[11] Patent Number: 5,602,695

[45] Date of Patent: Feb. 11, 1997

[54] CASSETTE LOADING MECHANISM FOR RECORDING AND PLAYBACK APPARATUS

[75] Inventors: Tatsumi Nishijima; Hidekazu Takeda, both of Hiratsuka; Kenmei Masuda, Yokohama; Hikaru Mizutani, Minoo; Yoshimi Maehara, Otsu, all of Japan

[73] Assignees: Hitachi, Ltd., Tokyo; Hitachi Maxell, Ltd., Osaka, both of Japan

[21] Appl. No.: 266,856

[22] Filed: Jul. 5, 1994

[30] Foreign Application Priority Data

Jul. 2, 1993 [JP] Japan .................................. 5-164457

[51] Int. Cl.⁶ ......................... G11B 5/008; G11B 15/675
[52] U.S. Cl. ............................................. 360/94; 360/96.5
[58] Field of Search ................................ 360/93, 94, 95, 360/96.1–96.5, 85, 132; 242/338, 338.4

[56] References Cited

U.S. PATENT DOCUMENTS

| 5,016,127 | 5/1991 | Inoue et al. | 360/94 |
| 5,046,169 | 9/1991 | Tsujia | 360/96.5 |
| 5,101,304 | 3/1992 | Sakumoto et al. | 360/96.5 |
| 5,121,271 | 6/1992 | Sakumoto et al. | 360/94 |
| 5,184,261 | 2/1993 | Noguchi | 360/94 |
| 5,231,553 | 7/1993 | Weber et al. | 360/96.5 |
| 5,357,385 | 10/1994 | Shimizu et al. | 360/96.5 |
| 5,386,329 | 1/1995 | Ikegawa | 360/94 |
| 5,416,650 | 5/1995 | Otonomiya et al. | 360/92 |

FOREIGN PATENT DOCUMENTS

| 63-2184 | 1/1988 | Japan . |
| 01125752 | 5/1989 | Japan . |
| 0528608 | 2/1993 | Japan . |

*Primary Examiner*—Stuart S. Levy
*Assistant Examiner*—Paul J. Ditmyer
*Attorney, Agent, or Firm*—Antonelli, Terry, Stout & Kraus, LLP

[57] ABSTRACT

A cassette loading mechanism for loading either a smaller tape cassette or a larger tape cassette into a recording/ reproducing apparatus, having apparatus for causing the large cassette to avoid obstructions in a cassette holder during insertion of the large cassette and of enabling the stable insertion of the larger tape cassette in the cassette holder. The cassette loading mechanism has a cassette holder provided with contact members disposed so as to engage only the larger tape cassette and so as to move members provided on the cassette holder for use with the smaller tape cassette to a retracted position. The member for use with the smaller tape cassette and the contact member are formed in an integral unit to ensure the correct operation of the cassette loading mechanism.

5 Claims, 8 Drawing Sheets

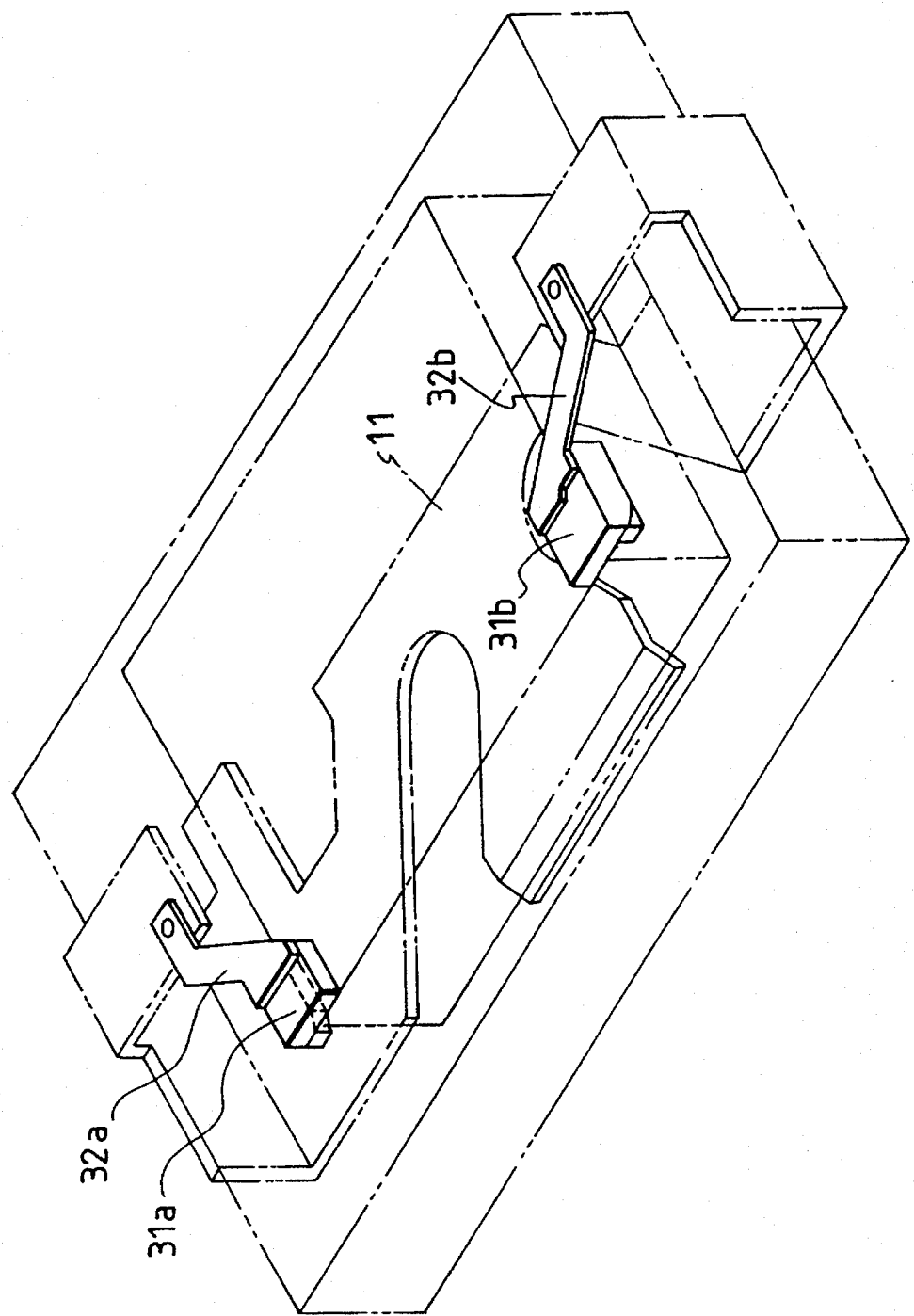

CASSETTE LOADING MECHANISM FOR RECORDING AND PLAYBACK APPARATUS

BACKGROUND OF THE INVENTION

The present invention relates to a cassette loading mechanism for a recording/reproducing apparatus and, more particularly, to a cassette insertion stabilizing apparatus and an incorrect cassette insertion preventing apparatus for ensuring successful insertion of two kinds of tape cassettes, i.e., a smaller tape cassette and a larger tape cassette differing from each other in case size and thickness, through a cassette inlet opening formed in a recording/reproducing apparatus to set either the larger tape cassette or the smaller tape cassette at a predetermined position within the recording/reproducing apparatus.

SML cassettes having different case sizes corresponding to recording times, such as D3 cassettes, are well known. Such cassettes are described in the "Proposed SMPTE Standard for Digital Video Recording ½ inch Type D3 Composite Format Tape Cassette", Jan. 2, 1992. A cassette loading mechanism capable of correctly loading such tape cassettes of different sizes is disclosed, for example, in Japanese Utility Model Publication (Kokoku) No. 5-16672.

As shown in FIG. 6A, the D3 cassette has a locking member 5 for locking a front lid 3 at a closed position, and the locking member 5 is supported pivotally on the side wall of the case body of the cassette. When the cassette is inserted in a cassette holder 11 in the direction of the arrow A, an unlocking member 7 engages the locking member 5 and turns the locking member 5 in the direction of the arrow B to unlock the front lid 3. A lengthwise guide groove 100 is formed in the bottom wall of the case body and a guide rail 12 is formed on the cassette holder 11. When the cassette is inserted in the cassette holder 11, the guide rail 12 engages the guide groove 100 to guide the cassette to prevent the incorrect insertion of the cassette. Therefore, a plurality of cuts of a depth L are formed in the lower part of the front wall of the D3 cassette. When the cassette is inserted in the cassette holder 11 in the direction of the arrow A, a stopper 22 engages a stepped part 8 formed in a fixed part of the front lid of the cassette to position the cassette on the cassette holder 11.

An 8 mm video tape cassette as shown in FIG. 6B has a construction similar to that of the D3 cassette. The 8 mm video tape cassette differs from the D3 cassette in that the front lid 3 of the 8 mm video tape cassette does not have a part corresponding to the stepped part 8.

Recently, further reduction in size and weight of recording/reproducing apparatus (VTR), such as video cameras, has been desired and efforts for the development of techniques for the reduction in size and weight of recording/reproducing apparatus have been made in other fields as well. Generally, the size of a VTR mechanism is dependent on the respective shapes of the cylinder and the cassette. Therefore, the sizes of the cylinder and the cassette must be reduced to reduce the size of the mechanism. Efforts for increasing the rotating speed of the cylinder and the contact angle have been made to reduce the diameter of the cylinder, and efforts have been made to develop a new cassette of external dimensions smaller than those of the 8 mm video tape cassette.

If the thickness of such a new cassette is reduced to its smallest possible thickness, it becomes impossible to form a guide groove corresponding to the guide groove 100 in the cassette for preventing the incorrect insertion of the cassette in the bottom wall of the new cassette. Also, any stepped part like the stepped part 8 of the 8 mm video tape cassette as shown in FIG. 6B is not formed in the front wall of the new cassette having a very small thickness. A system intended to use the foregoing plurality of cassettes differing from each other in size and shape must be provided with means for correctly receiving any one of those cassettes without using the guide groove system. If the cassettes are not provided with the stepped part 8, the system must be provided with means for ensuring stable operation without forming any guide groove for avoiding interference with the lid unlocking members disposed at different positions used for the different sizes of the cassettes.

A larger cassette and a smaller cassette based on the current 8 mm video tape cassette, and a cassette holder for holding such cassettes will be described with reference to FIGS. 7A and 7B.

Referring to FIGS. 7A and 7B, there are shown a smaller cassette 1, i.e., a cassette having comparatively small external dimensions for holding an 8 mm video tape, a larger cassette 2, i.e., a cassette having comparatively large external dimensions for holding an 8 mm video tape, a cassette holder 11, guide members 12a and 12b fixed to the cassette holder 11 at an interval slightly greater than the width W of the smaller cassette, a first lid unlocking member 7 for unlocking the lid of the smaller cassette, first insertion limiting members 22 for limiting the insertion of the smaller cassette in the cassette holder 11, a second lid unlocking member 18 for unlocking the front lid of the larger cassette, and second insertion limiting members 17. The first insertion limiting members 22 and the second insertion limiting members 17 are provided respectively for the smaller cassette and the larger cassette, because the opening 101 of the smaller cassette and the opening 102 of the larger cassette are different from each other.

When the smaller cassette having a reduced thickness and the larger cassette are formed on the basis of the 8 mm video tape cassette, the cassette holder 11 must be provided with the guide members 12a and 12b specially for the smaller cassette, and with lid unlocking members and the insertion limiting members respectively for the smaller cassette and the larger cassette. When inserting the larger cassette 2 in the cassette holder 11, the guide members 12a and 12b for guiding the smaller cassette, the first lid unlocking member 7 and/or the first insertion limiting members 22 interfere with the larger cassette 2. Consequently, in the conventional apparatus the larger cassette 2 cannot be set in place in the cassette holder 11.

SUMMARY OF THE INVENTION

It is an object of the present invention to provide a cassette loading mechanism for a recording/reproducing apparatus, having a cassette holder capable of admitting either of two kinds of tape cassettes, i.e., a smaller tape cassette and a larger tape cassette, and capable of solving the problem that the insertion of the larger tape cassette in the cassette holder to its predetermined operating position is obstructed by a member provided on the cassette holder for the smaller tape cassette.

Another object of the present invention is to provide a cassette loading mechanism for a recording/reproducing apparatus having a cassette holder capable of admitting either of two kinds of tape cassettes, i.e., a smaller tape cassette and a larger tape cassette that can be operated reliably and be manufactured at a reduced cost.

With the foregoing object in view, the present invention provides a cassette loading mechanism for a recording/reproducing apparatus including a cassette holder capable of admitting either of a first tape cassette, and a second tape cassette having a case size and a thickness greater than those of the first tape cassette, a first insertion limiting member provided on the cassette holder to limit the insertion of the first tape cassette in the cassette holder, a first lid unlocking member provided on the cassette holder so as to be brought into contact with a front lid locking member for locking the front lid of the first tape cassette to unlock the front lid of the first tape cassette, and a contact member for coming into contact with only the second tape cassette and in response to such contact moving the first insertion limiting member and the first lid unlocking member to a retracted position at which the first insertion limiting member and the first lid unlocking member will not interfere with insertion of the second tape cassette into the cassette holder. The contact member is combined with the first insertion limiting member and the first lid unlocking member.

In accordance with the present invention when a larger cassette is inserted in the cassette holder of the cassette loading mechanism thus constructed, the larger tape cassette comes into contact with the contact member and shifts the contact member. The contact member shifts the first insertion limiting member and the first lid unlocking member to a retracted position at which the first insertion limiting member and the first lid unlocking member will not interfere with the insertion of the larger tape cassette. Therefore, the insertion of the larger tape cassette in the cassette holder is not obstructed by the first insertion limiting member or the first lid unlocking member.

When the contact member is combined with the first insertion limiting member and the first lid unlocking member, the first insertion limiting member and the first lid unlocking member can be positively retracted, and the respective costs of the cassette loading mechanism and the tape cassettes can be reduced.

BRIEF DESCRIPTION OF THE DRAWINGS

The improvements of the present invention and the advantages resulting therefrom will become apparent upon reading the following description of the preferred embodiments in light of the drawings in which like parts are designated with like numerals and in which:

FIG. 4A, 4B and 4C are a schematic plan, schematic sectional and perspective views of small and larger cassettes and a cassette holder for explaining the operation of the cassette loading mechanism of the embodiment illustrated in FIG. 3;

DETAILED DESCRIPTION OF THE PREFERRED EMBODIMENTS

Preferred embodiments of the present invention will be described hereinafter with reference to the accompanying drawings.

An embodiment of the present invention will be described with reference to FIGS. 1A, 1B and 2.

Figure 1A:
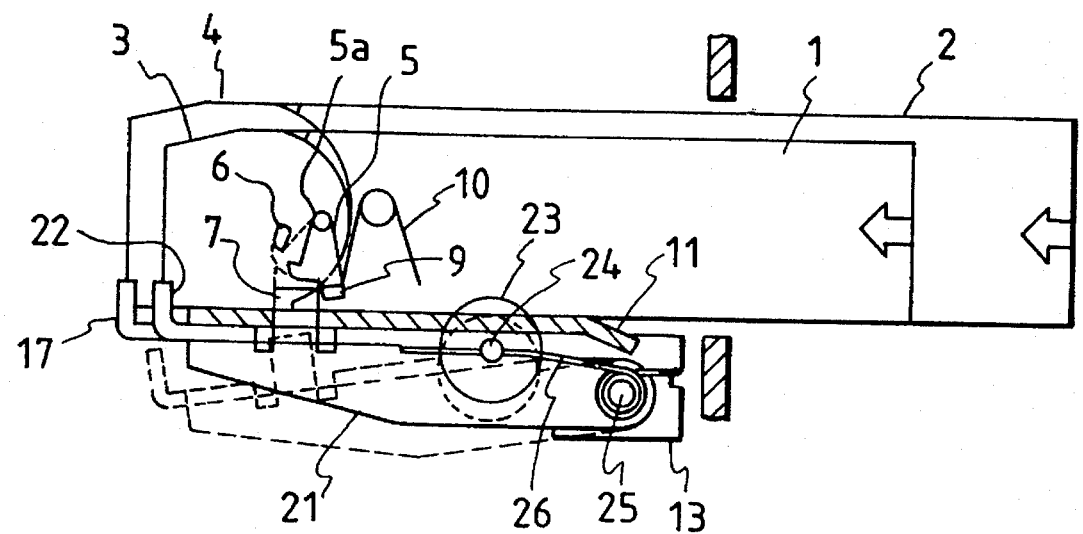
FIGS. 1A and 1B are schematic sectional views of small and large cassettes and a cassette holder for explaining the operation of a cassette loading mechanism in an embodiment of the present invention.

Referring to FIG. 1A, a first tape cassette 1 is provided with a first front lid 3 that opens forward, and a second tape cassette 2 is provided with a second front lid 4 that opens forward. The front lids 3 and 4 are locked respectively by locking members 5. Each locking member 5 is able to turn on a pin 5a between a position indicated by continuous lines and a position indicated by broken lines shown in FIG. 1A. The locking member 5 has a hooked part that engages a lug 6 to lock the front lid when the locking member is at the position indicated by broken lines, and a projection 9 that rests against a first lid unlocking member 7. The locking member 5 is biased by a spring 10.

Figure 2A:
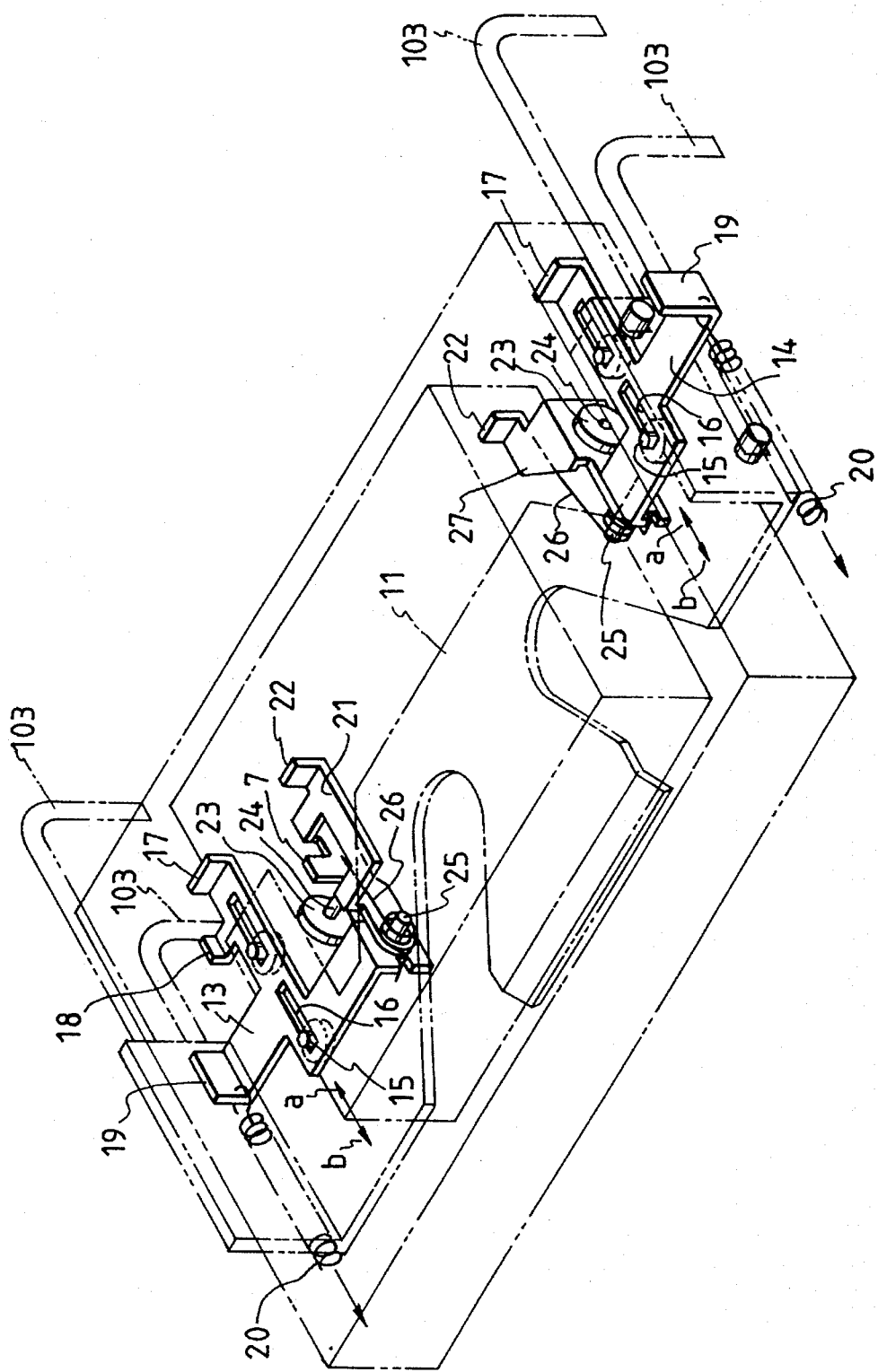
FIGS. 2A and 2B are a perspective and disassembled views of the cassette loading mechanism in the embodiment illustrated in FIGS. 1A and 1B.

Referring to FIG. 2A a cassette holder 11 has a flat bottom wall and opposite side walls formed by bending the opposite side ends of the flat bottom wall.

A pair of second movable members 13 and 14 are disposed respectively in the opposite side ends of the bottom wall of the cassette holder 11. As shown in FIG. 1B, the left-hand second movable member 13 is provided with slots 16 and is guided for movement along the lower surface of the cassette holder 11 in the directions of the arrows a and b by pins 15 inserted in the slots 16. As shown in FIG. 2A the left-hand second movable member 13 is provided integrally with a second insertion limiting member 17, a second lid unlocking member 18 and a cassette ejecting member 19. The left-hand second movable member 13 is biased continuously in the direction of the arrow b by an extension spring 20.

As shown in FIG. 1A, a left-hand first movable member 21 is connected pivotally to the left-hand second movable member 13. The left-hand first movable member 21 is provided integrally with a first insertion limiting member 22 the first lid unlocking member 7, and a roller 23, i.e., a contact member. The roller 23 is supported for rotation by a pin 24 on the left-hand first movable member 21. The left-hand first movable member 21 is able to turn on a pin 25 between an operating position where the left-hand first movable member 21 is in contact with the cassette holder 11, and a retracted position indicated by broken lines in FIG. 1A. The left-hand first movable member 21 is biased continuously toward the operating position by a torsion spring 26.

Figure 2B:
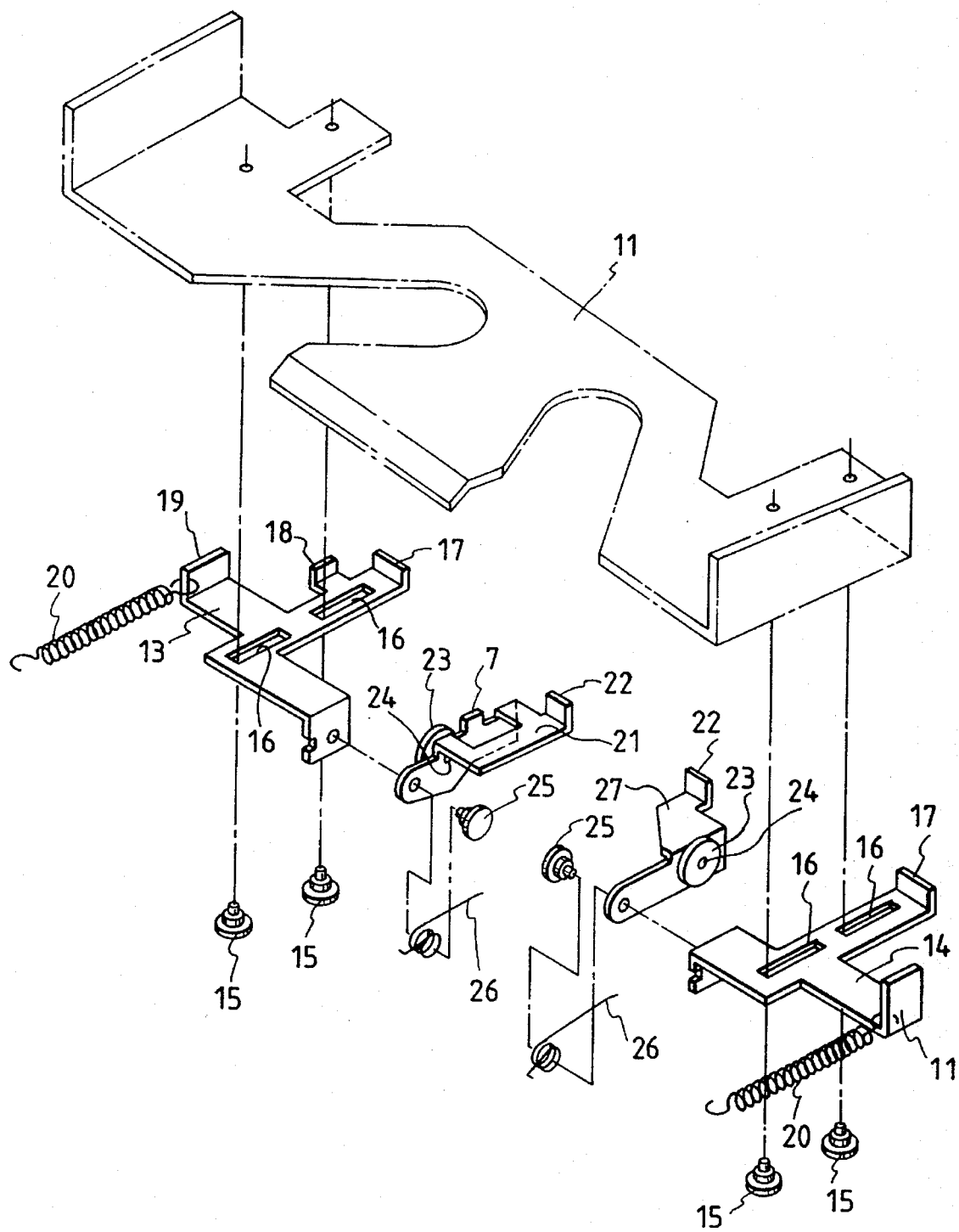

As shown in FIG. 2, a right-hand first movable member 27 and a right-hand second movable member 14 similar to the left-hand first movable member 21 and the left-hand second movable member 13, respectively, are disposed in the right-hand side of the bottom wall of the cassette holder 11. Since the respective shapes of the right-hand first movable member 27 and the right-hand second movable member 14 are the mirror images of those of the left-hand first movable member 21 and the left-hand second movable member 13, respectively, except that the right-hand first movable member 27 and the right-hand second movable member 14 are not provided with any members corresponding to the first and second lid unlocking members of the left-hand movable members 13 and 21, the parts of the right-hand first movable member 27 and the right-hand second movable member 14 are the same as those of the left-hand first movable member 21 and the left-hand second movable member 13 and are denoted by the same reference characters. The description of the right-hand first and second movable members and, operation thereof will be omitted.

Referring to FIG. 1A, when the first tape cassette 1, i.e., a smaller tape cassette, is inserted in the cassette holder 11, the front lid locking member 5 is turned from the position indicated by broken lines to the position indicated by continuous lines by the first lid unlocking member 7 to unlock the front lid of the first tape cassette 1. In this state, the front wall of the first tape cassette 1 rests against the first insertion limiting members 22. When the first tape cassette 1 is further pushed into the cassette holder 11, the first movable members 21 and 27 are moved together with the second movable members 13 and 14 by the first tape cassette 1 in the direction of the arrow as shown in FIG. 1B relative to the cassette holder 11 as far as the pins 15 engage the front ends of the slots 16. In this state, the first tape cassette 1 is set in place on the cassette holder 11. When inserting the first tape cassette 1 in the cassette holder 11, the first tape cassette 1 is guided by guide members, not shown, for movement in the direction of the arrow as shown in FIG. 2.

Referring to FIG. 1A, when the second tape cassette 2, i.e., a larger tape cassette, is inserted in the cassette holder 11, the roller 23 is depressed by the second tape cassette 2, whereby the first movable member 21 supporting the roller 23 is turned on the pin 25 against the resilience of the torsion spring 26 from the operating position indicated by continuous lines to the retracted position indicated by broken lines as shown in FIG. 1A. Consequently, the first lid unlocking member 7 and the insertion limiting members 22, which are formed integrally with the first movable members 21, are moved down to the retracted positions, so that the insertion of the second tape cassette 2 is not obstructed by the first lid unlocking member 7 and the insertion limiting member 22.

As the second tape cassette is pushed further into the cassette holder 11, the front lid is unlocked and the second tape cassette 2 is set in place on the cassette holder 11 by the same operation as that for setting the first tape cassette 1 in place on the cassette holder 11.

Upon the detection of the insertion of the first or the second tape cassette, the cassette holder 11 is moved first horizontally and then vertically along guide grooves 103 as shown in FIG. 2 to set the first or the second tape cassette at a predetermined position in the recording/reproducing apparatus. This cassette loading operation is reversed for a cassette unloading operation for moving the cassette holder 11 in the reverse direction to send out the tape cassette from the recording/reproducing apparatus. During the cassette unloading operation, a pin 30 fixed to the extremity of a swing arm 29 pivotally supported on a shaft 28 is in contact with a lug 19 formed by raising part of the second movable member as shown in FIG. 1B. The swing arm 29 is turned so that a cassette ejecting mechanism, not shown, will move the first and the second movable member in the direction of the arrow b relative to the cassette holder 11 to eject the tape cassette 1.

Another embodiment of the present invention will be described hereinafter with reference to FIGS. 3, 4A, 4B, 4C and 5. A cassette holder 11 and the second movable members 13 and 14 employed in the this embodiment shown in FIGS. 3, 4A, 4B, 4C and 5 are the same as those employed in this embodiment shown in FIGS. 1A, 1B and 2. The first movable members 21 and 27 employed in the second embodiment is different in construction and mode of operation from that employed in the embodiment shown in FIGS. 1A, 1B and 2. Therefore, the construction and the mode of operation of the first movable member 21 and 27 employed in this embodiment will be described in detail.

Figure 3:
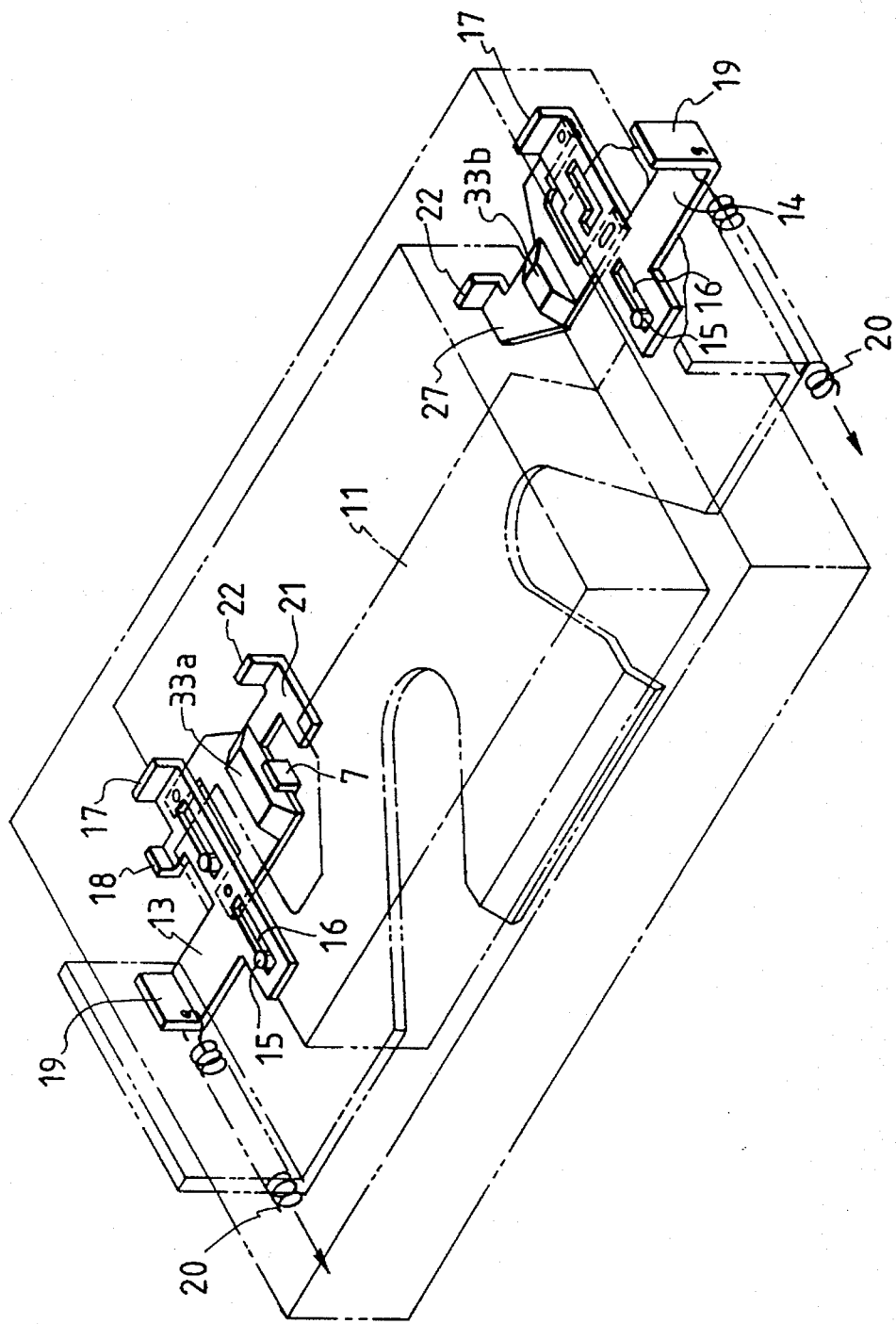
FIG. 3 is a perspective view of a cassette loading mechanism in another embodiment of the present invention.

Referring to FIG. 3, the left-hand first movable member 21 disposed in the left-hand side of a cassette holder is fastened to a left-hand second movable member 13 by fastening means, such as screws or by welding, such as spot welding, and is provided integrally with a first lid unlocking member 7, a first insertion limiting member 22 and a guide member 33a, i.e., a contact member. Similarly, a right-hand first movable member 27 disposed in the right-hand side of the cassette holder 11 is fastened to a right-hand second movable member 14 by the same fastening means or welding, and is provided integrally with a first insertion limiting member 22 and a guide member 33b.

As shown in FIGS. 3, 4A, 4B and 4C the interval between the guide members 33a and 33b is slightly greater than the width of the first tape cassette 1.

Figure 1B:
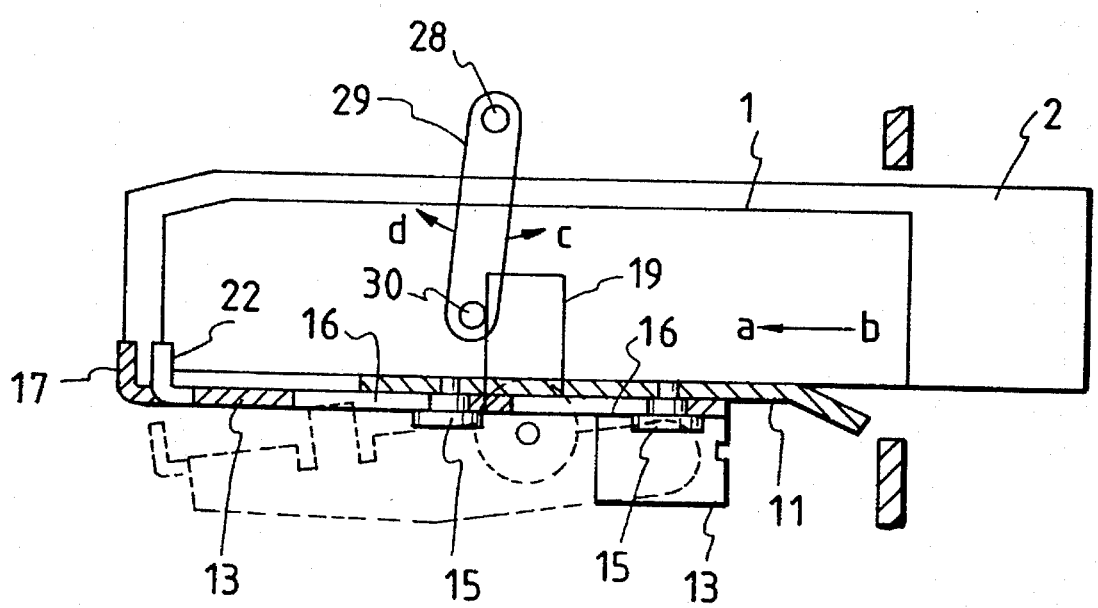

Whereas the left-hand first movable member 21 of the embodiment shown in FIGS. 1A, 1B and 2 is turned in parallel to the cassette insertion direction to its retracted position, the left-hand first movable member 21 of this embodiment is depressed at the guide member 33a by the tape cassette and moves substantially perpendicularly to the cassette insertion direction to its retracted position. In this embodiment, the guide members 33a and 33b for guiding the first tape cassette 1 are used also as the contact members to be brought into contact with the second tape cassette 2 to reduce the cost of the recording/reproducing apparatus.

As shown in FIGS. 4A, 4B, 4C and 5, the first tape cassette 1 is guided at its upper parts at opposite side walls and opposite side ends by second guide members 31a and 31b attached respectively to plate springs 32a and 32b. Each second guide member 31a, 31b is capable of being moved between a position indicated by continuous lines and a position indicated by broken lines in FIG. B.

Figure 4A:
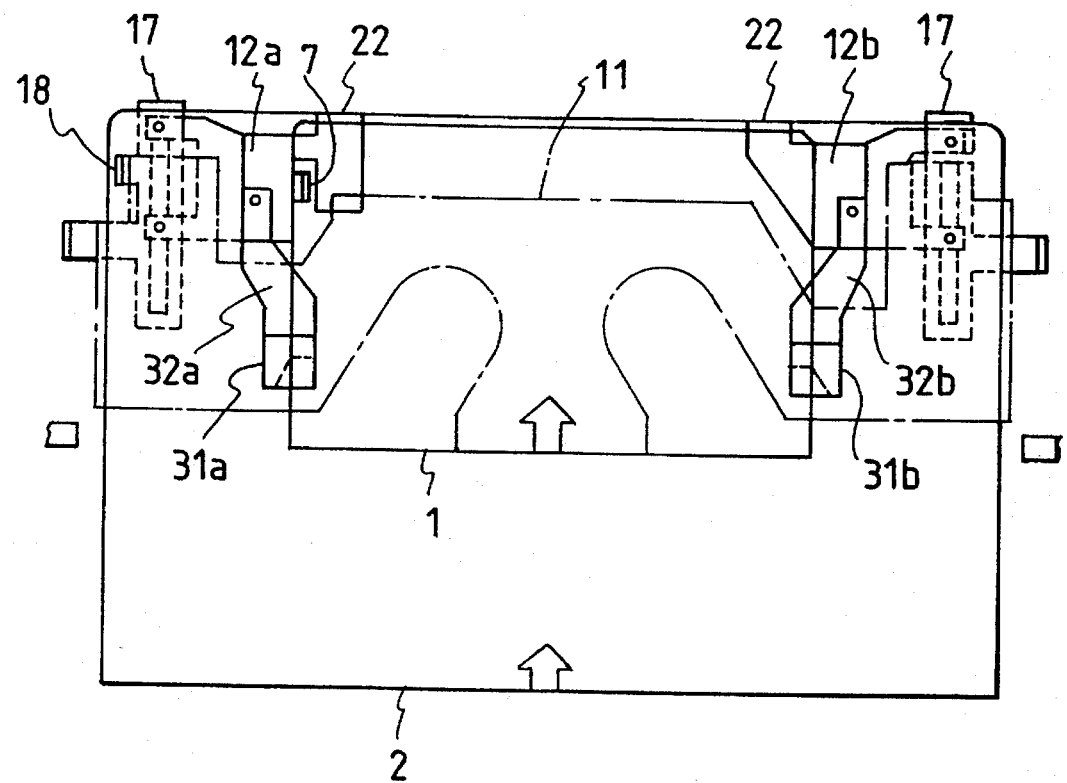
Figure 4B:
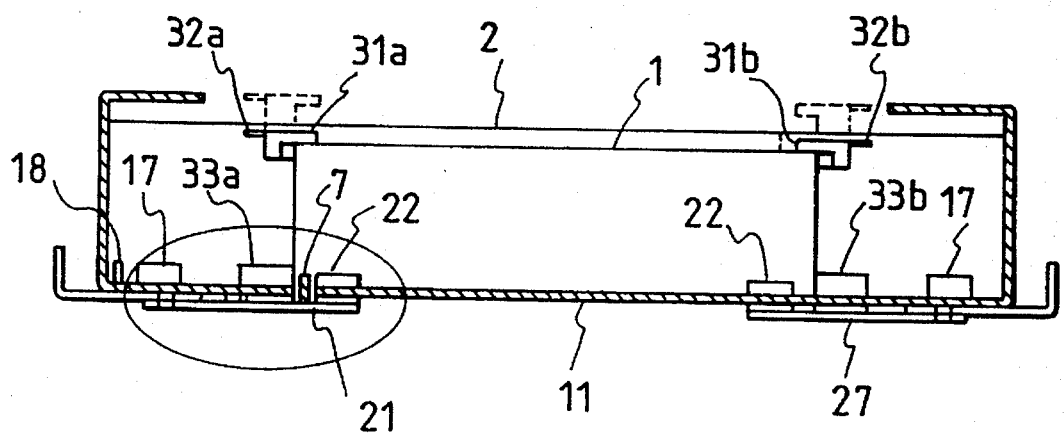
Figure 5:
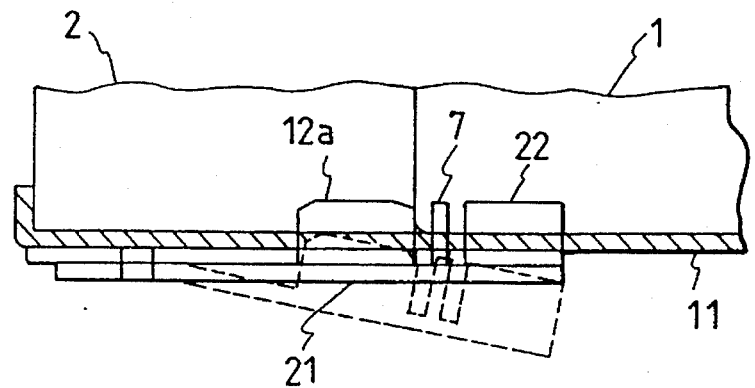
FIG. 5 is an enlarged, fragmentary sectional view of an essential portion of the cassette loading mechanism of FIGS. 4A, 4B and 4C.
Figure 6A:
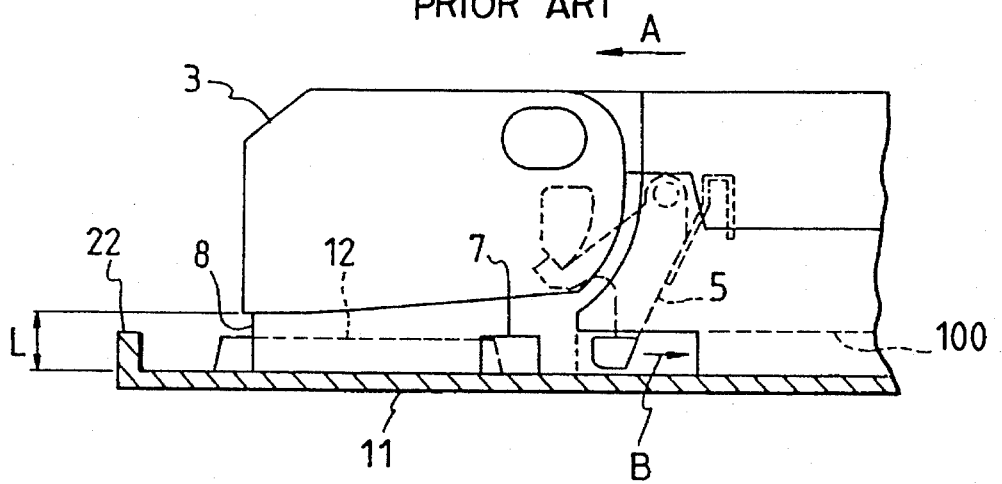
FIGS. 6A and 6B are fragmentary side views of conventional tape cassettes.
Figure 6B:
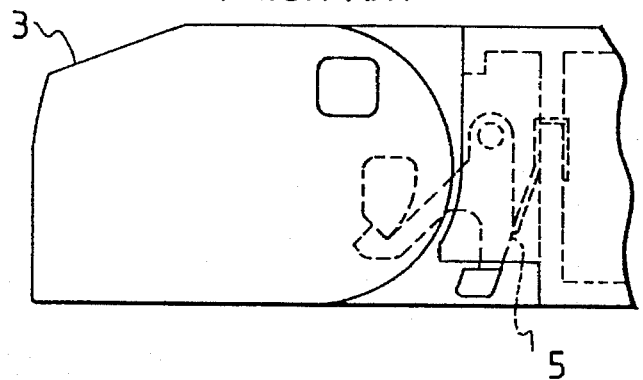
Figure 7A:
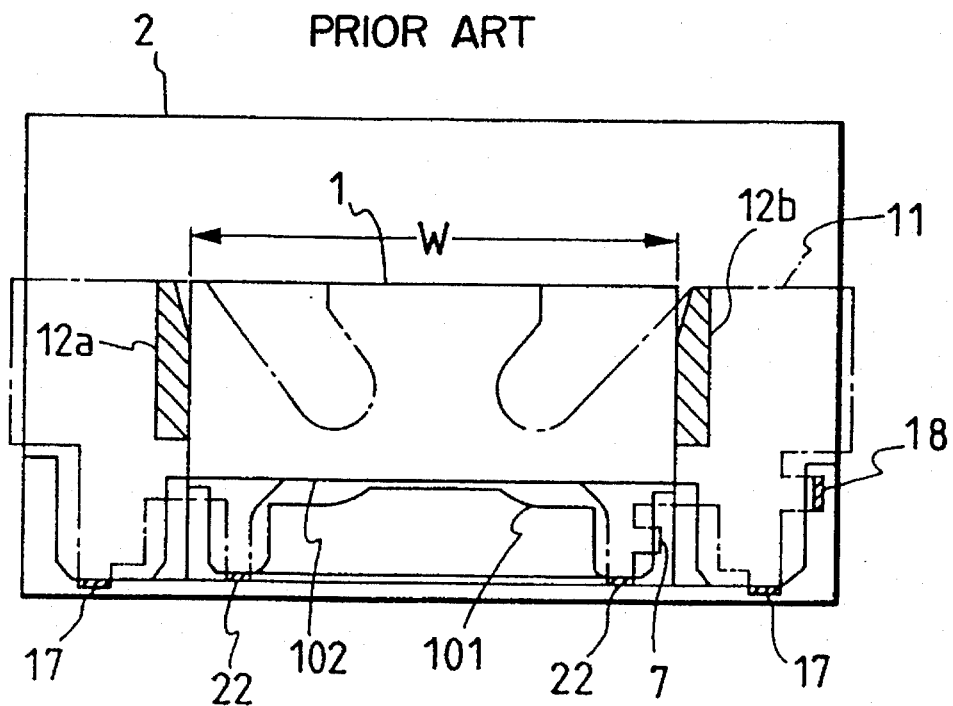
FIGS. 7A and 7B are schematic plan and schematic sectional views of a conventional cassette holder.
Figure 7B:
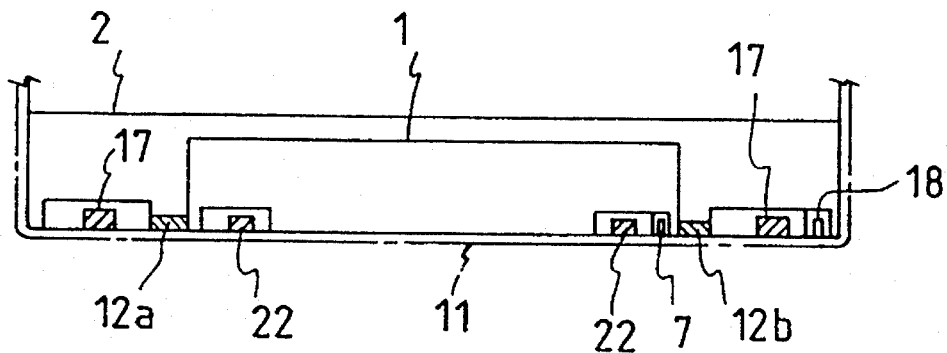

Referring to FIGS. 4A, 4B, 4C and 5, when the first tape cassette 1, i.e., the smaller tape cassette, is inserted in the cassette holder 11, the upper parts of the side walls of the first tape cassette 1 come into contact with the second guide members 31a and 31b. Thus, the first tape cassette 1 is guided at its side walls and is depressed by the second guide members 31a and 31b. As the first tape cassette 1 is inserted further in the cassette holder 11, the lower parts of the side walls of the first tape cassette 1 come into contact with the first guide members 33a and 33b so that the first tape cassette 1 is guided correctly. When the first tape cassette is set at a predetermined position as shown in FIG. 4A, the first lid unlocking member 7 unlocks the front lid and the first insertion limiting members 22 inhibit the further insertion of the first tape cassette 1.

When the second tape cassette, i.e., the larger tape cassette, is inserted in the cassette holder 11, the second guide members 31a and 31b are forced to move to the retracted positions indicated by broken lines by the front part of the second tape cassette 2. However, the second tape cassette 2 is depressed by the plate springs 32a and 32b. As the second tape cassette 2 is inserted further in the cassette holder 11 to set the second tape cassette 2 at a predetermined position as shown in FIG. 4A, the lower part of the second tape cassette 2 engages the guide members 33a and 33b. Then, the guide member 33a is depressed from the position indicated by continuous lines to the position indicated by broken lines.

Thus, the first lid unlocking member 7 and the first insertion limiting members 22, which are combined with the guide member 33a, are depressed. Therefore, the second tape cassette 2 can be inserted in the cassette holder 11 and set at the predetermined position without being obstructed by the first lid unlocking member 7 and the first insertion limiting member 22.

Although the contact member employed in this embodiment is formed integrally with the left-hand first moving part 21, the contact member may be substituted by the roller 23 shown in FIGS. 1A, 1B and 2 to reduce the resistance against the insertion of the tape cassette in the cassette holder.

As is apparent from the foregoing description, the cassette loading mechanism in accordance with the present invention for a recording/reproducing apparatus has the cassette holder provided with the lid unlocking member for unlocking the front lid of the smaller tape cassette, and insertion limiting members for positioning the smaller tape cassette on the cassette holder. The larger tape cassette comes into contact with contact members which move the lid unlocking member for unlocking the front lid of the smaller tape cassette and the insertion limiting members for positioning the smaller tape cassette to a retracted position when inserted in the cassette holder. Therefore, the insertion of the larger cassette in the cassette holder is not obstructed by any members of the cassette holder intended for use with the smaller tape cassette. Since the contact member, the lid unlocking member for unlocking the front lid of the smaller tape cassette and the insertion limiting member are combined in an integral unit, the operation of the cassette loading mechanism is reliable and the cassette loading mechanism for a recording/reproducing apparatus can be fabricated at a reduced cost.

There has been described a new and useful cassette loading mechanism. It should be appreciated that modifications and additions will be apparent to those of ordinary skill in the art in applying the teachings of the invention described herein to various applications. Accordingly, the invention should not be limited by the description herein of the preferred embodiments but rather the invention should be construed in accordance with the following claims.

We claim:

1. A cassette loading mechanism for loading cassettes into a recording/reproducing apparatus, comprising:

a cassette holder for receiving, upon insertion, a first tape cassette or a second tape cassette, said second tape cassette having a case size and a thickness greater than a case size and thickness of said first tape cassette, and carrying the received cassette to a predetermined position;

a lid unlocking member provided on said cassette holder for contacting a front lid locking member of said first tape cassette to unlock a front lid of said first tape cassette;

an insertion limiting member provided on said cassette holder to limit insertion of said first tape cassette in said cassette holder;

a first guide member for contacting opposite sides of said first tape cassette to guide said first tape cassette to said predetermined position;

a moving device, responsive to insertion of said second tape cassette into said cassette holder, for moving said lid unlocking member, said insertion limiting member, and said first guide member to a non-interference position at which said lid unlocking member, said insertion limiting member, and said first guide member will not interfere with insertion of said second tape cassette in said cassette holder;

wherein said lid unlocking member, said insertion limiting member, and said first guide member are combined with said moving device.

2. A cassette loading mechanism according to claim 1, wherein a roller member is combined with said moving device.

3. A cassette loading mechanism for loading cassettes into a recording/reproducing apparatus, comprising:

a cassette holder for receiving, upon insertion, a first tape cassette or a second tape cassette, said second tape cassette having a case size and a thickness greater than a case size and thickness of said first tape cassette, and carrying the received cassette to a predetermined position;

a lid unlocking member provided on said cassette holder for contacting a front lid locking member of said first tape cassette to unlock a front lid of said first tape cassette;

an insertion limiting member provided on said cassette holder to limit insertion of said first tape cassette in said cassette holder;

a first guide member for contacting opposite sides of said first tape cassette to guide said first tape cassette to said predetermined position;

a moving device, responsive to insertion of said second tape cassette and said cassette holder, for moving said lid unlocking member, said insertion limiting member, and said first guide member to a non-interference position at which said lid unlocking member, said insertion limiting member, and said first guide member will not interfere with insertion of said second tape cassette in said cassette holder, said lid unlocking member, said insertion limiting member, and said first guide member being combined with said moving device;

a second guide member for guiding and depressing the first tape cassette when the first tape cassette is inserted into the cassette holder, said second guide member having a first part for contacting an upper surface of said first tape cassette and a second part for contacting right-hand and left-hand side surfaces of the first tape cassette, said second guide member moving to a retracted position and depressing the second tape cassette when the second tape cassette is inserted in the cassette holder; and an elastic member for biasing the second guide member downward.

4. A cassette loading mechanism according to claim 3, wherein a roller member is combined with said moving device.

5. A cassette loading mechanism according to claim 3, wherein said second guide member has a third part for contacting an upper surface of the second tape cassette.

* * * * *